Figure 1:
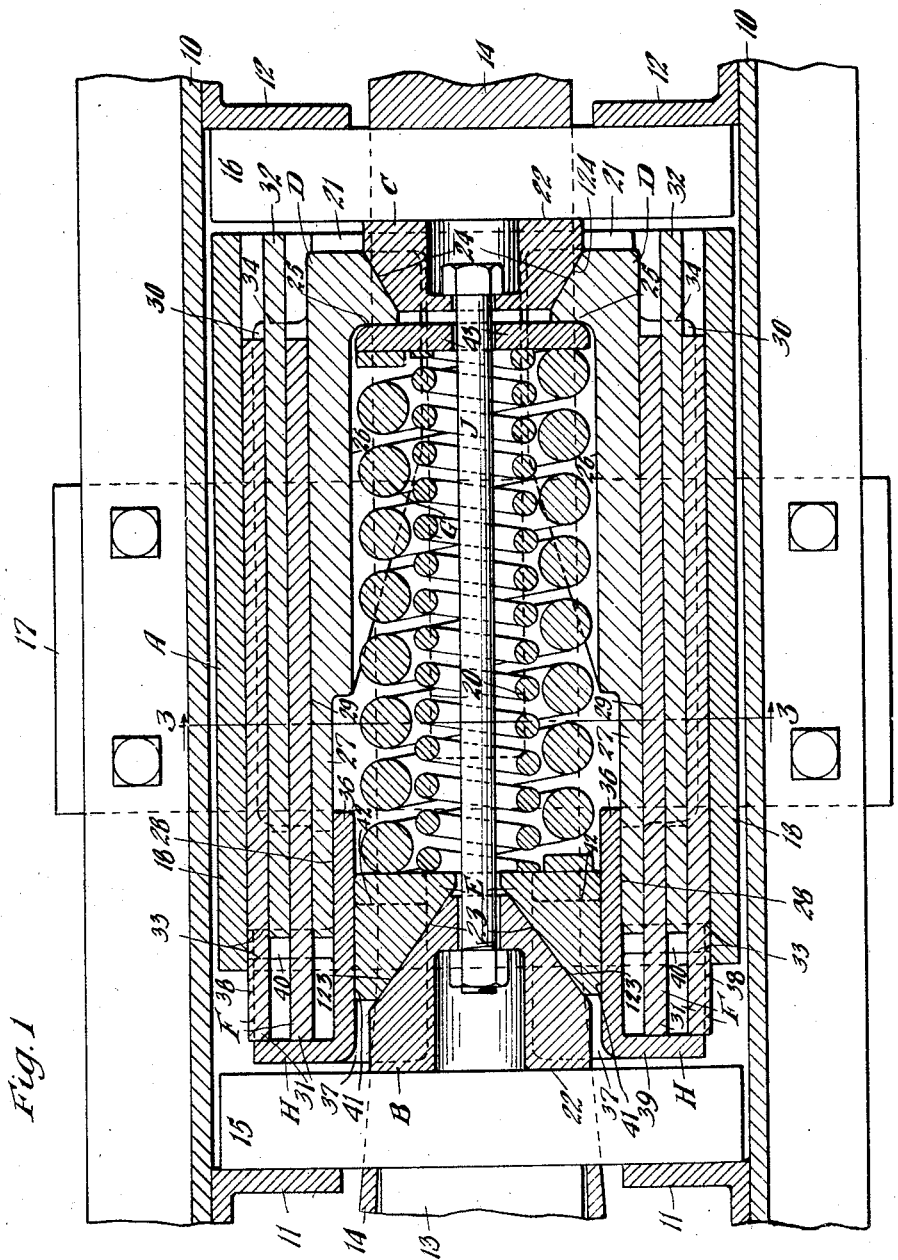

May 8, 1928.  
S. B. HASELTINE  
1,668,901  
FRICTION SHOCK ABSORBING MECHANISM  
Original Filed July 10, 1924   2 Sheets-Sheet 1

Witnesses  
Wm. Geiger

Inventor  
Stacy B. Haseltine  
By George I. Haight  
His Atty.

May 8, 1928.
S. B. HASELTINE
FRICTION SHOCK ABSORBING MECHANISM
Original Filed July 10, 1924      2 Sheets-Sheet 2
1,668,901
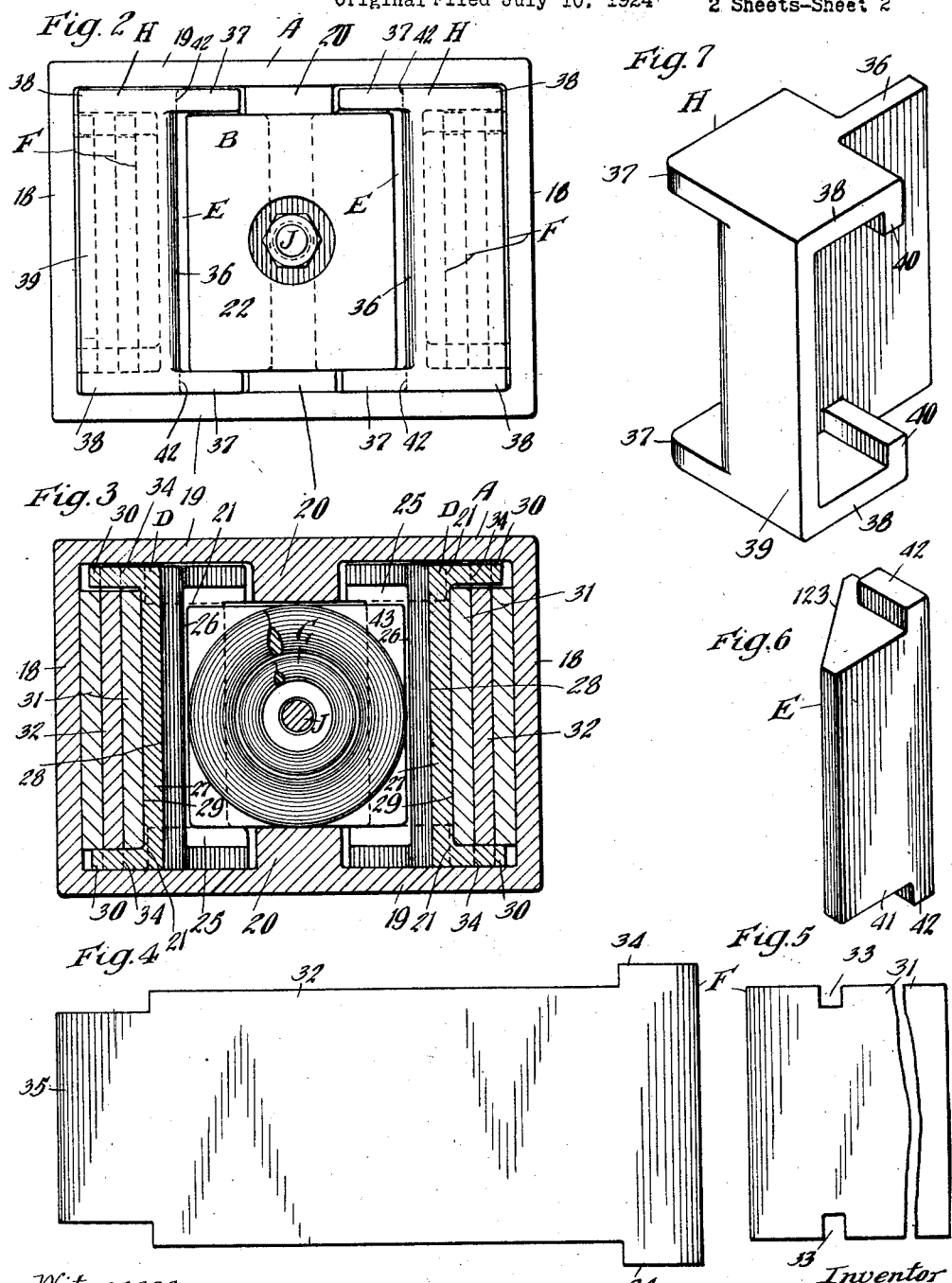
Witnesses
Wm. Geiger
Inventor
Stacy B. Haseltine
By George D. Aught
His Atty.

Patented May 8, 1928.

1,668,901

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 10, 1924, Serial No. 725,106. Renewed December 29, 1926.

This invention relates to improvements in friction shock absorbing mechanisms.

One object of the invention is to provide a high capacity shock absorbing mechanism, of the intercalated plate type, especially adapted for railway draft riggings, having an initial, relatively light action and high capacity frictional resistance during the remainder of the compression stroke, wherein the various friction elements are so arranged that release of the mechanism and restoration of the shell and other parts to normal position will be assured.

Another object of the invention is to provide a shock absorbing mechanism of the character indicated, comprising a group of relatively movable friction plates and friction wedge means for placing said plates under lateral pressure, including a pair of friction wedge shoes at each end of the mechanism, wherein the shoes of one pair have extensions overlapping and frictionally engaging the shoes of the other pair, thus insuring greater distribution of the spreading pressure throughout the length of the plates.

Other objects and advantages of the invention will more clearly and fully appear from the description and claims hereinafter following.

In the drawings, forming a part of this specification, Figure 1 is a longitudinal horizontal, sectional view of a portion of a railway draft rigging showing my improvements in connection therewith. Figure 2 is a front end, elevational view of the shock absorbing mechanism proper. Figure 3 is a vertical, transverse, sectional view of the shock absorbing mechanism proper, corresponding substantially to the line 3—3 of Figure 1. Figure 4 is a detail, side elevational view of one of the friction plates used in connection with my improved mechanism. Figure 5 is a detail, side elevational view of another friction plate, the same being shown broken to better accommodate the view to the sheet of the drawing. Figure 6 is a detail, perspective view of a wedge friction shoe of said mechanism. And Figure 7 is a detail, perspective view of a clip for returning the plates to normal position.

In said drawings, 10—10 indicate channel-shaped center or draft sills of a railway car underframe, to the inner faces of which are secured front stop lugs 11—11 and rear stop lugs 12—12. The inner end portion of the drawbar is designated by 13, the same being operatively associated with a hooded yoke 14 of well known form, within which are disposed the friction shock absorbing mechanism proper, a front follower 15 and a rear follower 16. The yoke and parts therewithin are supported in operative position by a detachable saddle plate 17.

The improved shock absorbing mechanism proper comprises broadly a friction shell A; a front wedge block B; a rear wedge block C; two similar friction shoes D—D; two similar friction shoes E—E; two groups of intercalated friction plates F—F; a main spring resistance G; a pair of plate restoring clips H; and a retainer bolt J.

The friction shell A is in the form of a rectangular casting open at the front and rear ends and has spaced, longitudinally disposed side walls 18 and longitudinally disposed, spaced top and bottom walls 19, the side walls presenting longitudinally extending friction surfaces adapted to coact with the outermost plates of the groups of friction elements F—F. The shell A is preferably of such a length that the front and rear ends thereof are normally spaced from the front and rear followers respectively, as clearly shown in Figure 1, the rear end of the shell being spaced a relatively short distance from the rear follower. Each of the walls 19 has, on the inner side thereof, a longitudinally disposed central rib 20 having its front end spaced inwardly from the corresponding end of the shell and extending substantially to the rear end of the shell. The opposed top and bottom ribs 20 maintain the spring resistance element G in central position, the bottom rib further acting as a support for the spring. At the rear end of the shell, on the interior thereof, the top and bottom walls are provided with short, transversely extending ribs 21, the free ends of the ribs being spaced from the corresponding side walls 18 to accommodate the friction plates therebetween. The ribs 21 are adapted to be engaged by the rear ends of the shoes D to effect restoration of the shell to normal position.

The front and rear wedge blocks B and C are of similar construction, each being in the form of a hollow casting having a flat outer face 22 adapted to abut the inner surface of the corresponding main follower. Each block is also provided with a pair of wedge faces disposed on opposite sides of the longitudinal center of the mechanism, said wedge faces converging inwardly of the mechanism, the faces of the wedge blocks B and C, respectively, cooperating with the adjacent sets of friction wedge shoes E and D, the wedge faces of the block B being designated by 23 and the corresponding faces of the block C being designated 24. As shown, the faces 23 are somewhat longer than the faces 24.

The friction shoes D—D are disposed at the rear end of the mechanism, each shoe being interposed between the wedge C and the corresponding group of friction plates. On the inner side, that is the side nearest the longitudinal axis of the mechanism, each shoe D has a wedge face 124 correspondingly inclined to and adapted to cooperate with one of the faces 24 of the wedge block C. At the inner end of the wedge face 124, each block has a vertically disposed abutment shoulder 25, and inwardly of said shoulder the corresponding side of the body portion of the shoe is recessed as indicated at 26 to accommodate the adjacent side of the outer coil of the spring resistance element G. Each of the shoes D is also provided with a vertically disposed, integral plate-like section 27 at the front end thereof, overlapping the corresponding friction shoe E, presenting a longitudinally disposed inner friction surface 28 cooperating with the corresponding clip H. Each shoe also has an outer, longitudinally disposed friction surface 29 adapted to cooperate with the innermost plate of the corresponding group F. Along the top and bottom edges of each shoe D are provided horizontally disposed, laterally, outwardly projecting flanges 30 adapted to embrace the corresponding group of plates F and act as top and bottom guides for the same. In addition to serving as guide means, the flanges also act as stiffening members and prevent buckling or bending of the shoes and the corresponding group of plates during the compression stroke of the mechanism. As shown in Figure 1, the flanges of each shoe D are shorter than the shoe, having their front and rear ends spaced inwardly from the corresponding ends of said shoe.

As herein shown, two groups of friction plates F are employed, one group being disposed on each side of the mechanism. Each group is preferably composed of three plates, two like, inner and outer plates 31 and an intermediate plate 32. The outer plate 31 of each group has frictional contact with the inner surface of the corresponding side wall 18 of the shell and the innermost plate 31 of each group frictionally engages the surface 29 of the adjacent wedge shoe D. As best shown in Figure 5, each plate 31 has top and bottom notches 33 at the forward end thereof, for a purpose hereinafter described. As best shown in Figure 4, each plate 32 has top and bottom lugs 34 at the rear end thereof adapted to co-act with the rear edges of the top and bottom flanges 30 of the corresponding shoe D. At the front end each plate 32 is cut away along the top and bottom edges to provide a section 35 of reduced height.

The two clips H, which are of similar construction, are disposed at the front end of the mechanism at opposite sides thereof. Each clip H comprises a longitudinally extending, vertically disposed, plate-like section 36, having horizontally disposed top and bottom members at the forward end thereof presenting pairs of spaced top and bottom flanges 37—37 and 38—38 at the opposite sides thereof, the flanges 38 being connected by a transversely disposed, vertical end wall 39 formed integral with the plate-like section 36. The flanges 38 are somewhat shorter than the flanges 37 and have inner, transverse ribs 40 at the rear ends thereof. The two clips H have the respective pairs of flanges thereof reversely disposed, as clearly shown in Figure 1, the flanges 37 embracing the corresponding friction shoe E and the corresponding side of the wedge B, and the flanges 38 embracing the front ends of the corresponding group of plates F, with the top and bottom ribs 40 thereof engaging within the top and bottom notches of the plates 31 and the front ends of said plates abutting the inner surface of the end wall 39. The plates 31 of the two groups are thus anchored to the respective clips H for movement therewith. The reduced sections 35 of the plates 32 work freely between the ribs 40 of the clips H, the sections 35 being of such a length as to provide proper clearance to permit full movement of the plates 32 during a compression stroke. The plate-like section 36 of each clip H is interposed between one of the groups of plates F and the corresponding shoe E, presenting an outer, longitudinally disposed friction surface co-operating with the friction surface 28 of the plate-like section of the shoe D at the corresponding side of the mechanism. The lugs 34 at the rear ends of the plates 32 are adapted to be engaged by the flanges 30 of the corresponding friction shoes D to restore said plates to normal position. The two wedge shoes E, which are of like design, are disposed at opposite sides of the wedge B, each shoe having an outer flat friction surface 41 adapted to co-operate with the inner surface of the plate-like section 36 of the corresponding clip H, and a wedge face 123 correspondingly inclined to and adapted to co-operate with the adjacent wedge face 23 of the block B. At the inner end, each shoe E has top and bottom lugs 42 presenting transverse abutment shoulders adapted to engage the inner ends of the top and bottom flanges 37 of the corresponding clips H. The lugs 42 function to restore the clips to normal position, the latter in turn restoring the plates 31, which are anchored thereto, to normal position also. The clips H are preferably tempered so that they also serve as wear plates, co-acting with the front ends of the friction plates 31.

The spring resistance element G, which comprises an inner light coil and an outer relatively heavy coil is interposed between the front and rear pairs of shoes D and E, a spring follower 43 being interposed between the rear end of the spring resistance and the shoulders 25 of the shoes D. The front end of the spring resistance G bears directly on the inner ends of the shoes E.

The parts of the friction shock absorbing mechanism are held in assembled relation and maintained at the proper overall length by the retainer bolt J extending through the inner coil of the spring resistance G and having its front and rear ends anchored in recesses of the hollow front and rear wedges B and C, respectively. The bolt J also serves to maintain the mechanism under initial compression. As wear occurs on the various friction and wedge faces, compensation therefor will be had by the expansion of the spring resistance J, which due to the initial compression hereinbefore referred to, is free to expand to move the respective shoes outwardly, clearance being left for this purpose, the shoes E projecting a slight distance inwardly beyond the wedge B and the spring follower 43 being slightly spaced from the inner end of the wedge C.

The parts of the mechanism are so proportioned, that in the normal position thereof, the clips H against which the front ends of the plate 31 abut, are slightly spaced from the front follower and the rear ends of the plates 32 and the corresponding end of the shell A are also slightly spaced from the rear follower, the clips to which the plates 31 are anchored being held in their outermost position by the lugs 42 on the shoes E, outward movement of the shoes E being limited by engagement with the wedge B, and the friction shell A and the plates 31 being held in their outermost position by the flanges 30 of the shoes D and the rear ends of said shoes engaging the lugs 34 of the plates 32 and the ribs 21 of the shell A, respectively. Outward movement of the shoes D is limited by engagement with the wedge C. As clearly shown in Figure 1, in the normal position of the parts, the friction plates 31 project an appreciable distance beyond the front end of the shell A and the plates 32 have their rear ends alined with the rear end of the shell.

The operation of the mechanism is as follows, assuming an inward or buffing movement of the drawbar. The front follower 15 will be moved rearwardly, forcing the wedge B rearwardly also, spreading the shoes E apart and at the same time compressing the spring resistance element G and thereby forcing the rear pair of wedge shoes D into wedging engagement with the rear wedge C, the latter being held stationary by the follower 16. The wedging action set up between the front and rear wedges and shoes places the friction plates under lateral pressure. As the rearward movement of the follower 15 continues, the front set of shoes E will be moved rearwardly, sliding on the friction surfaces 41 of the clips H, and the front follower will gradually approach the front end of the clips H, until the clips are engaged thereby, whereupon the plates of the groups F, cooperating with the shell A, will be forced rearwardly in unison due to the friction between the plates. At this time, the sections 36 of the clips and the innermost plates of the groups F will slip on the friction surfaces of the shoes D, augmenting the frictional resistance offered. During the described movement of the clips H and the shoes E, the shoulders 42 of the shoes will be moved away from the inner ends of the flanges 37 of the clips H. During the bodily movement of the shell and plates, the lugs 34 of the plates 32 will be moved away from the rear ends of the flanges 30 of the shoes D, and the flanges 21 of the shell will be moved away from contact with the ends of the shoes D. The described action will continue until the rear end of the shell A and the rear end of the plates 32 engage the rear follower, whereupon the plates 31 will be moved rearwardly relative to the plates 32, shell A and shoes D, further augmenting the frictional resistance offered. The described relative movement of the followers, plates and shell continues until the actuating force is removed, or until the front and rear ends of the shell A abut the front and rear followers, whereupon the force is transmitted directly through the shell and followers to the rear stop lugs, the parts being so proportioned as to thereby prevent the springs from being driven solid.

During draft, the action is substantially the reverse of that just described. the front follower 15 remaining stationary and the rear follower being moved toward the same.

Upon reduction of the actuating force, the wedging pressure will be relieved, due to the relatively blunt angle included between the wedging faces of the front and rear wedges, and there will be an additional release movement of the friction shoes and wedges due to the lugs 42 of the shoes E being spaced from the inner ends of the flanges 37 of the clips H, and the shoulders 34 of the plates 32 and the flanges 21 of the shell being spaced from the rear ends of the flanges 30 of the shoes D and the rear ends of the body portions of the shoes D, respectively, during compression of the mechanism.

An easy and quick release and certain reduction of lateral pressure on the groups of friction plates is thus assured. As the shoes at the opposite ends of the mechanism move apart, due to the expansive action of the spring G, the lugs on the shoes E and the rear ends of the flanges of the shoes D will, respectively, come into engagement with the clips H and the lugs 34 of the plates 32, thus restoring all the plates to normal position, the plates 31 being returned by the clips to which they are anchored. As will be evident, the shell A will be moved in unison with the plates until the ribs 21 come into abutment with the rear ends of the rear shoes, thereby limiting effecting restoration of the shell to normal position.

I have herein shown and described what I now consider the preferred manner of carrying out my invention, but the same is merely illustrative, and I contemplate all changes and modifications that come within the scope of the claims appended hereto.

I claim:

1. In a friction shock absorbing mechanism, the combination with a plurality of longitudinally disposed, relatively movable, intercalated friction plates; of means for laterally compressing said plates, including wedge pressure creating means at opposite ends of the mechanism and a lateral pressure resisting member, each of said wedge pressure creating means including a pair of friction wedge shoes, certain of said shoes having frictional engagement with said plates; and friction means interposed between said last named shoes and the remaining shoes; and a spring resistance co-acting with said wedge pressure creating means.

2. In a friction shock absorbing mechanism, the combination with a plurality of longitudinally disposed, relatively movable, intercalated friction elements; of means for placing said elements under lateral pressure, including a lateral pressure resisting member and wedge pressure creating means at the opposite ends of the mechanism, each of said means including a pair of wedge friction shoes, each shoe of one pair having a friction plate section formed integral therewith; means co-acting with the other pair of shoes for returning certain of said plates to normal position, said last named means having frictional engagement with said shoes having the friction plate sections; and a spring resistance co-acting with the wedge pressure creating means.

3. In a friction shock absorbing mechanism, the combination with front and rear follower means; of a friction shell interposed between said follower means; a plurality of relatively movable friction plates within said shell, said plates being divided into two groups at opposite sides of the mechanism and co-acting with the respective side walls of the shell; a main spring resistance; spreading means at opposite ends of the mechanism, each of said spreading means including a pair of friction wedge shoes; and plate restoring means co-operating with alternate plates of said groups, said restoring means having frictional engagement with the front and rear shoes.

4. In a friction shock absorbing mechanism, the combination with front and rear followers; of a friction shell interposed between said followers; a plurality of relatively movable friction plates within said shell, said plates being divided into two groups at opposite sides of the mechanism and co-acting with the respective side walls of the shell; a main spring resistance; spreading means at opposite ends of said mechanism, each of said spreading means including a pair of wedge friction shoes, one pair of said shoes having means thereon engaging certain of said plates for restoring the same to normal position; plate restoring means anchored to the remaining plates, said past named means being adapted to be directly actuated by the other pair of shoes.

5. In a friction shock absorbing mechanism, the combination with front and rear followers; of a friction shell interposed between said followers, said shell having abutment means thereon; a plurality of relatively movable friction elements within the shell, said elements being divided into two groups at opposite sides of the mechanism and co-acting respectively with the opposite walls of said shell, alternate elements of each group having their front ends normally spaced from said front follower and the remaining elements having their rear ends normally spaced from the rear follower; lateral wedge pressure creating means at opposite ends of said mechanism interposed between said two groups of elements, said wedge pressure creating means including front and rear pairs of friction wedge shoes, one of said pairs being adapted to engage the abutment means of the shell to restore the same to normal position, said shoes also having abutment means thereon engaging certain of said plates for restoring the same to normal position; and a spring resistance element co-operating with said wedge pressure creating means.

6. In a friction shock absorbing mechanism, the combination with front and rear followers; of a friction shell interposed between said followers; a plurality of relatively movable friction elements within said shell, said elements being divided into two groups at opposite sides of the mechanism co-acting respectively with the opposite side walls of said shell; wear elements at one end of the mechanism engaging alternate plates of said groups, said wear elements being anchored to the plates and having longitudinal extensions; lateral wedge pressure creating means at opposite ends of said mechanism interposed between said two groups of friction elements, each lateral wedge pressure creating means including front and rear pairs of friction wedge shoes, both pairs of said shoes having friction surfaces co-operating with the extensions of said wear elements; and a spring resistance element co-acting with the wedge pressure creating means.

7. In a friction shock absorbing mechanism, the combination with follower acting means; of a friction shell; a plurality of relatively movable friction plates within said shell, said plates being divided into two groups at opposite sides of the mechanism; a main spring resistance; and wedge spreading means at opposite ends of said mechanism, said means including front and rear wedge friction shoes, one of the friction plates of each group being interposed between the corresponding front and rear shoes, and each having an abutment portion adapted to engage certain of the remaining plates of each group.

8. In a friction shock absorbing mechanism, the combination with front and rear followers; of a friction shell interposed between said followers; a plurality of relatively movable friction plates within the shell; means for placing said plates under lateral pressure, including front and rear pairs of wedge shoes and front and rear wedges co-operating therewith; a main spring resistance; and plate actuating and restoring means, said means having frictional engagement with said shoes and being outwardly movable with certain of said shoes.

9. In a friction shock absorbing mechanism, the combination with a follower; of a plurality of relatively movable laterally displaceable intercalated friction plates, said plates being relatively movable longitudinally of the mechanism; certain of said plates each having laterally extended bearing means associated with one end thereof for receiving the actuating pressure from said follower; means for compressing said plates laterally; and a main spring resistance.

In witness that I claim the foregoing I have hereunto subscribed my name this 1st day of July, 1924.

STACY B. HASELTINE.